US012711540B1

(12) United States Patent
Raipati et al.

(10) Patent No.: US 12,711,540 B1
(45) Date of Patent: Aug. 18, 2026

(54) GENERATIVE ARTIFICIAL INTELLIGENCE (AI) DRIVEN SIMILARITY SEARCH

(71) Applicant: BBY SOLUTIONS, INC., Richfield, MN (US)

(72) Inventors: Rambabu Raipati, Lakeville, MN (US); Kannan Swaminathan, Eden Praire, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 19/358,264

(22) Filed: Oct. 14, 2025

(51) Int. Cl.
*G06Q 30/00* (2023.01)
*G06Q 30/0601* (2023.01)

(52) U.S. Cl.
CPC ... *G06Q 30/0643* (2013.01); *G06Q 30/06313* (2025.08)

(58) Field of Classification Search
CPC ........... G06Q 30/0601; G06Q 30/0613; G06Q 30/0623; G06Q 30/0629; G06Q 30/0631; G06Q 30/0643; G06Q 30/06313
See application file for complete search history.

(56) References Cited

U.S. PATENT DOCUMENTS 7,970,664 B2 6/2011 Linden et al.
7,987,188 B2 * 7/2011 Neylon ................. G06F 16/313 706/45
8,386,336 B1 * 2/2013 Fox .................... G06Q 30/0631 705/26.7
8,417,713 B1 * 4/2013 Blair-Goldensohn ........................ G06F 16/9535 705/347
8,620,767 B2 12/2013 Linden et al.
8,660,912 B1 2/2014 Dandekar
9,177,341 B2 11/2015 Wiggins et al.
11,386,478 B1 7/2022 Jones et al.
2001/0021914 A1 * 9/2001 Jacobi .................... G06Q 30/02 705/26.1

(Continued)

OTHER PUBLICATIONS

Wu, Renzhi, et al. “Rethinking similarity search: Embracing smarter mechanisms over smarter data.” arXiv preprint arXiv:2308.00909 (2023). (Year: 2023).*

(Continued)

*Primary Examiner* — Christopher B Seibert
(74) *Attorney, Agent, or Firm* — Schwegman, Lundberg & Woessner, P.A.

(57) ABSTRACT

Artificial intelligence (AI) techniques are applied for information retrieval and filtering, including with AI-driven search results and interactions that identify similar or related products within e-commerce environments. A method for performing a similarity search assisted by a generative AI model includes: receiving a request for a similarity search that is provided in response to a user interaction received in a user interface, and that includes a product identifier of a selected product; generating a search query to perform the similarity search, using at least one AI model that generates the search query based on attributes associated with the selected product; performing the similarity search with the generated search query on a product catalog; selecting similarity search results in response to performing the similarity search on the product catalog; and presenting the similarity search results in the user interface.

20 Claims, 11 Drawing Sheets

(56) References Cited

U.S. PATENT DOCUMENTS

2005/0152610 A1* 7/2005 Hagiwara ............ H04N 1/4105 382/238
2005/0162670 A1* 7/2005 Shuler ................ H04N 1/00408 358/1.2
2006/0155684 A1* 7/2006 Liu ....................... G06F 16/954
2007/0046675 A1* 3/2007 Iguchi ..................... G06T 11/26 345/441
2009/0110089 A1* 4/2009 Green ................... H04L 5/0037 370/329
2009/0125371 A1* 5/2009 Neylon ................. G06F 16/313 707/739
2010/0114933 A1* 5/2010 Murdock ................ G06F 16/58 707/765
2010/0268661 A1* 10/2010 Levy ...................... G06Q 30/02 705/347
2012/0163707 A1* 6/2012 Baker ..................... G06F 16/58 382/159
2013/0076784 A1* 3/2013 Maurer ............... G06F 3/04847 345/629
2013/0305149 A1* 11/2013 Dimitrov ................ G06F 16/34 715/273
2014/0195931 A1* 7/2014 Kwon .................... G06Q 30/02 715/753
2014/0321761 A1* 10/2014 Wang .................... G06F 16/583 382/218
2014/0340419 A1* 11/2014 Otero ................. G01C 21/3667 345/619
2014/0351079 A1* 11/2014 Dong ................. G06Q 30/0282 705/26.7
2015/0379732 A1* 12/2015 Sayre, III ........... G06Q 30/0623 382/164
2016/0155173 A1* 6/2016 Isaacson ............ G06Q 30/0613 705/26.43
2016/0285808 A1* 9/2016 Franklin ............... H04L 51/216
2017/0193997 A1* 7/2017 Chen ....................... G10L 15/26
2018/0349472 A1* 12/2018 Kohlschuetter ..... G06F 16/3322
2020/0265055 A1* 8/2020 Venkoba ............... G06F 16/248
2020/0302296 A1* 9/2020 Miller ...................... G09B 5/00
2020/0388071 A1* 12/2020 Grabner .................. G06T 17/20
2021/0110464 A1* 4/2021 Tufegdzic ............ G06V 10/751
2021/0281569 A1* 9/2021 Soon-Shiong .......... H04L 63/10
2022/0215242 A1* 7/2022 Shalev ..................... G06N 3/08
2022/0215243 A1* 7/2022 Narayanaswami .......................... G06F 18/2193
2023/0118171 A1* 4/2023 Agarwal ............... G06F 16/367 704/9
2024/0242452 A1* 7/2024 Zhi ........................ G06N 3/094
2024/0281410 A1* 8/2024 Williams .............. G06F 16/122
2025/0165513 A1* 5/2025 Gudla ............... G06F 16/24522
2025/0298840 A1* 9/2025 Gong .................... G06F 16/538

OTHER PUBLICATIONS

Zheng, Wujie, Qirun Zhang, and Michael Lyu. "Cross-library api recommendation using web search engines." Proceedings of the 19th ACM SIGSOFT symposium and the 13th European conference on Foundations of software engineering. 2011. (Year: 2011).*

Woocommerce, "Product Filter—Stock", [Online]. Retrieved from the Internet https woocommerce.com document woocommerce-product-search blocks product-filter-stock , Accessed on Dec. 2, 2025, 8 pages.

Zappos.com, "Unisex Reebok Engine LT", [Online]. Retrieved from the Internet https www.zappos.com p unisex-reebok-engine-It product 10005782, Accessed on Dec. 2, 2025, 6 pages.

Zhang, Yinan, "Towards a Soft Faceted Browsing Scheme for Information Access", arXiv2002.08577v1 cs.IR, Feb. 20, 2020, 12 pages.

* cited by examiner

GENERATIVE ARTIFICIAL INTELLIGENCE (AI) DRIVEN SIMILARITY SEARCH

TECHNICAL FIELD

Embodiments discussed herein generally relate to artificial intelligence (AI) techniques and information systems, including the use of generative and predictive AI techniques for performing searches and queries, in multiple types of user interaction and information search environments.

BACKGROUND

In typical e-commerce user interfaces, users will search for products or services by providing textual search terms (e.g., keywords or phrases) that will be interpreted by a search engine, and the search engine will return a set of results that match the search terms. Customers may use search narrowing tools such as facets and filters to narrow down the search results to identify certain products or services with specific features that they are interested in.

Some search engines also provide the ability for customers to add recommended or suggested search terms into their search queries to find similar or related items. Such recommended or suggested terms may be generated based on what other customers are searching for, based on historically popular search terms, or based on search keywords and phrases related to the search results. However, in these scenarios, the search terms are typically human-selected and are subject to widescale changes and variation, and may not provide fully relevant results.

In addition to performing text-based searches, users may also discover related products or services on a site from advertising placements (e.g., a new product placed at the top of a search result), from curated experiences advertised in the user interface (e.g., deals, promotions, and category-based advertisements), or by manually navigating to related categories or types of items on the site. However, each of these approaches involves some manual human selection and guidance to identify a related product or service for a user.

DETAILED DESCRIPTION

Figure 1:
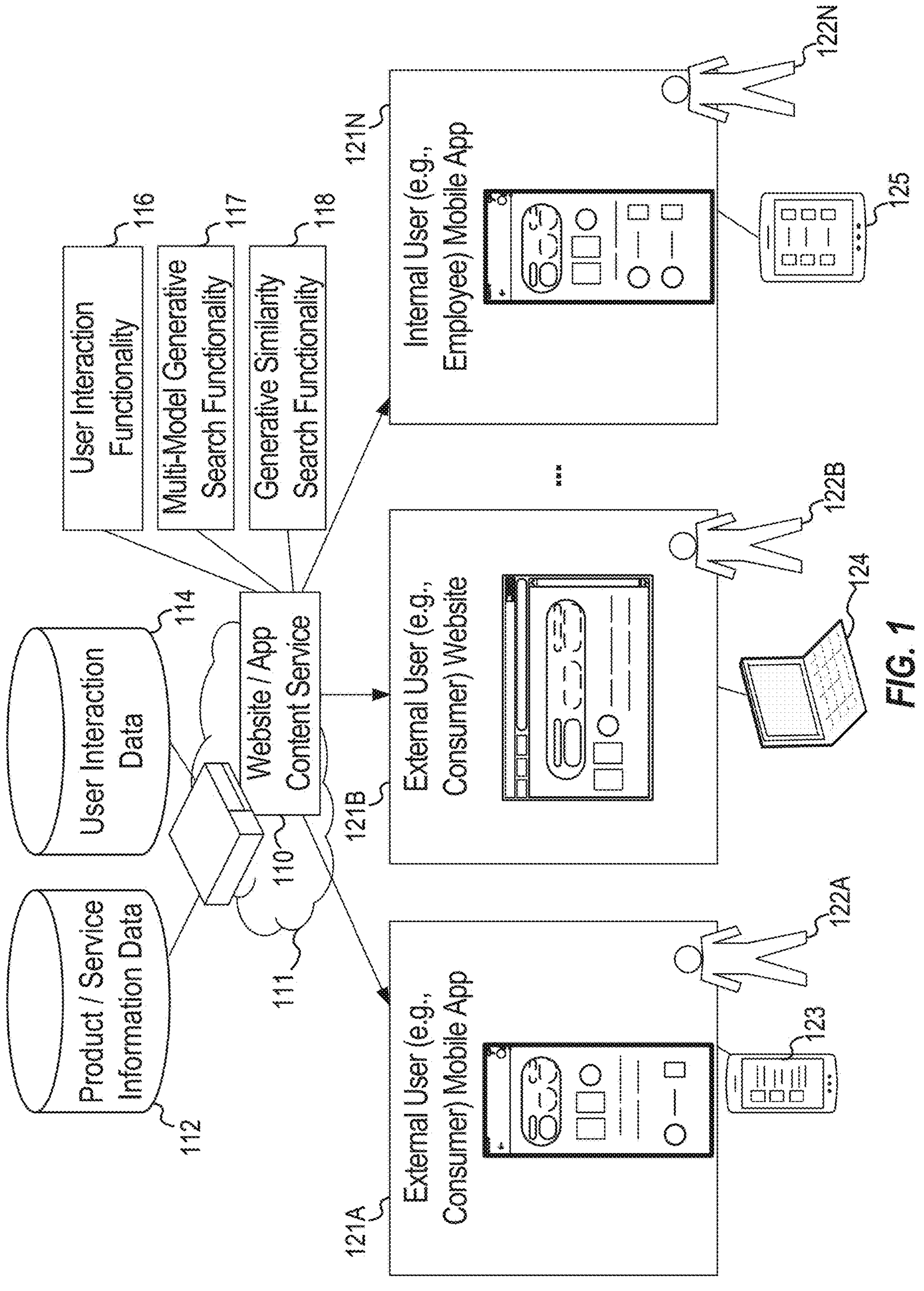
FIG. 1 illustrates scenarios for performing user searches and interactions using generative AI search and similarity search functionality integrated into an e-commerce content service, according to an example.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to features and logic of a computer system to improve capabilities and refine results for similarity searches, enhanced with implementations of artificial intelligence (AI). These similarity searches can be used to support a specialized type of "More Like This" functionality that leverages AI-generated searches to identify and present related items that have some similar attributes, such as similar features, functionality, price range, brand quality, reputation, usage, etc. A particular selected item that is used as a starting point for the similarity search is referred to herein as an "anchor item", as this item provides the "anchor" for generating the results of a new similarity search.

The discoverability of related or similar products and services may be enhanced by AI analysis that dynamically analyzes and determines relevant attributes and characteristics of the anchor item, such as a product type, product brand, applicable price range, and availability, to generate a curated results page such as a product listing page or "PLP" that presents a list of related products as the similarity search results. The integration of AI searching, including the use of generative and predictive AI models to generate and direct these searches, offers an improved approach to overcoming the limitations of existing approaches for handling "more like this" requests and similar types of similarity or related item searches.

By integrating AI-driven similarity searches, a search system can deliver more accurate results and personalized user experiences, to improve the accuracy and performance of resulting searches, while enhancing content discovery and engagement in a variety of e-commerce and information system lookups. This results in improved performance of search systems and user interfaces from the perspective of the end user (which receives faster and more accurate results) and the server and intermediate computer architecture (which can spend fewer resources in serving the search results). In addition to delivering an improved relevance and performance of search results, the following offers an improved approach to surface different combinations or groupings of search results, including new combinations or groupings of related item results that may not have been identified by human content curators. The use of an AI-assisted similarity search can also lead to significantly higher visibility of various products and resulting consumer engagement and conversion activities (e.g., product sales).

The ability to find "more like this" results can also improve a search not only based on prominent product attributes and characteristics, but also on inferred attributes and characteristics about the user, the user's session, and user preferences of what the user considers to be similar or relevant. The search queries that are generated by an AI model can also be personalized based on data that is known about the user, based on the activity of similar users, and based on whether the results are relevant to the current customer experience. Thus, a "more like this" search can dynamically adapt to help a user narrow, expand, or explore a different direction of search results. This functionality can replace traditional facets and filters that are very prevalent in traditional e-commerce search experiences.

As will be understood, the following approaches for similarity search refer to various types of e-commerce use cases (e.g., for the sale of products and services in an e-commerce website or app), but these approaches rely on a number of technical implementations and technical solutions to address the underlying problems of information search and retrieval. The following approaches reduce the need for static category creation and manual content selection (e.g., often established by human curators) while adding automation search processes and increasing the accuracy of search results. These approaches can be used to efficiently surface similar or related results when searching through large amounts of data, such as a product catalog of hundreds, thousands, or millions of items (and many more attributes and characteristics), allowing a more precise and narrower set of results to be delivered to a user with fewer navigation and server requests. The approaches can also be used to precisely deliver product attributes and filtering operations without the use of facets or human-curated categories. This results in an accompanying improvement in data processing operations, reduction in bandwidth and data computation resources, and related computing system benefits.

FIG. 1 illustrates example scenarios for performing user searches and interactions using generative AI search and similarity search functionality integrated into an e-commerce content service. Here, user interfaces 121 to access content from a content service 110 are provided in: a user interface 121A in a consumer mobile application, presented to a consumer 122A via a mobile device 123 (e.g., a smartphone); a user interface 121B in a consumer website, presented to another consumer 122B via a personal computing device 124; and an internal user (e.g., employee) user interface 121N presented to an employee user 122N via a mobile device 125 (e.g., a tablet). A consumer, as discussed herein, is not limited to a single home user or private customer, but may include a variety of entities representing a person, business entity, group, organization, etc. Thus, a user, as discussed herein, may encompass any number of entities that interact with the user interface. Further, a user may also be embodied by an automated agent (e.g., a bot) that acts on behalf of some user or entity.

In the scenario of FIG. 1, the consumers 122A, 122B respectively access the content service 110 to obtain e-commerce content in the user interfaces 121A, 121B presented on a computing device (e.g., smartphone, tablet, personal computer). In an example, the user interface 121B is provided from a website operated in a web browser of the personal computing device 124, whereas the user interface 121A is provided from a software app operated on the mobile device 123 (e.g., a software app distributed via an app store). The consumer 122A and consumer 122B each operate the user interfaces 121A, user interface 121B to perform some e-commerce transaction, such as to identify, browse, reserve, purchase, schedule, or otherwise interact with aspects of a particular product or service, including with use of a search tool, search results, "more like this" similarity search option, and search refinements as discussed herein. Example arrangements of consumer user interfaces in an e-commerce setting are provided in FIG. 3A, FIG. 3B, and FIG. 4, discussed below. Similar or enhanced functionality may be included in the user interface 121N to perform internal (e.g., employee-only or user-restricted) functions such as inventory checking, reservation, price adjustments and discounts, and the like.

The user interfaces 121 may provide pre-assembled or newly-assembled content from the content service 110, such as content assembled in a cloud service 111 from the product and service information data 112 or user interaction data 114 (e.g., data obtained from one or more data stores, servers, content delivery network (CDN) caches, and the like). The user interfaces 121 may present this data in the form of text, graphics, video, relating to products, services, or other informational content. The product and service information data 112, user interaction data 114, and related information (e.g., product or service details, user profile information, payment information, etc.) may be cached for use by the user interfaces 121. Additional explanations of how the product and service information data 112 and the user interaction data 114 are used by a content service for specific searching use cases are discussed below with reference to FIG. 7 and FIG. 8.

The user interfaces 121 output content that is hosted, generated, or facilitated by the content service 110 and the cloud service 111, such as content provided by or on behalf of a business entity, such as a retailer. The content service 110 may provide user interaction functionality 116 to enable specific transactions and activities (e.g., shopping carts, reservations, shopping lists, checkout, payment) in connection with the commerce items.

The content service 110 may provide multi-model generative search functionality 117 to generate AI-driven searches for the commerce items, based on AI models that generate additional search terms to evaluate information from the product and service information data 112 and from the user interaction data 114. For example, an input search term such as "laptops" can be expanded to search many different attributes of laptops and related product types. Outputs from the multi-model generative search functionality 117 may include additional or different search terms, search options, search queries, search recommendations, and search refinements.

The content service 110 may also provide generative similarity search functionality 118 to locate related or similar results based on relevant attributes (e.g., type, brand, specifications, price, item descriptions, user reviews, etc.) of one or more commerce items (e.g., products or services). The related or similar results may be triggered based on a search for related or similar items using new searches of the product and service information data 112. Search results from the similarity search functionality 118 are specifically depicted in FIG. 3B.

The similarity search functionality 118 leverages the multi-model generative search functionality 117 to dynamically identify related or similar products based on attributes identified from a starting, anchor product. Unlike conventional search and browsing interfaces, this functionality bypasses the need for explicit user input or feedback to determine which attributes are "relevant", "similar", or of interest to the user. When invoked, the similarity search functionality 118 uses algorithms to extract and analyze known attributes such as product type, brand, price range, and availability status directly from the anchor product.

Figure 3A:
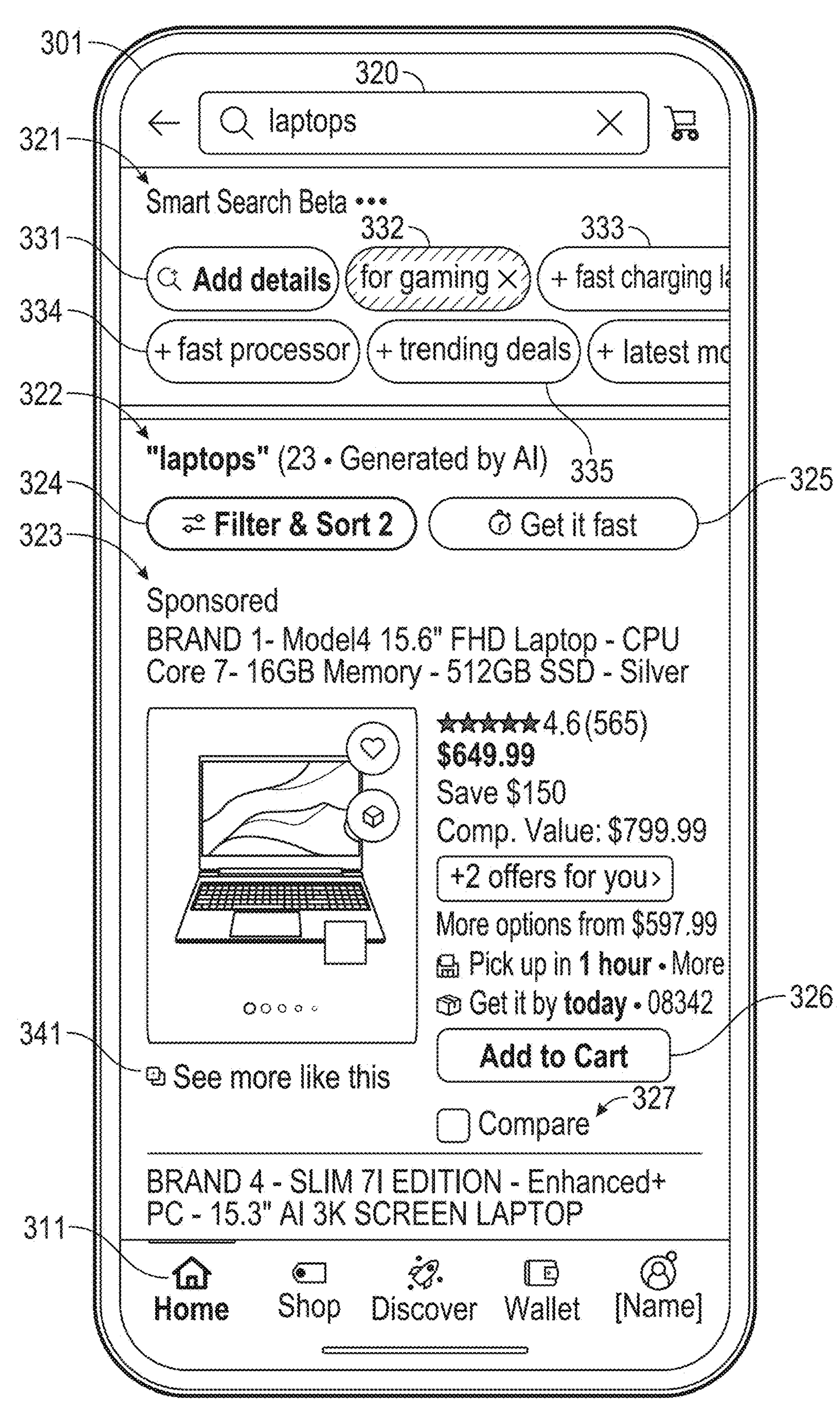
FIGS. 3A to 3B illustrate screenshots of a mobile device user interface providing interactions with a generative AI similarity search of an e-commerce content service, according to various examples.
Figure 3B:
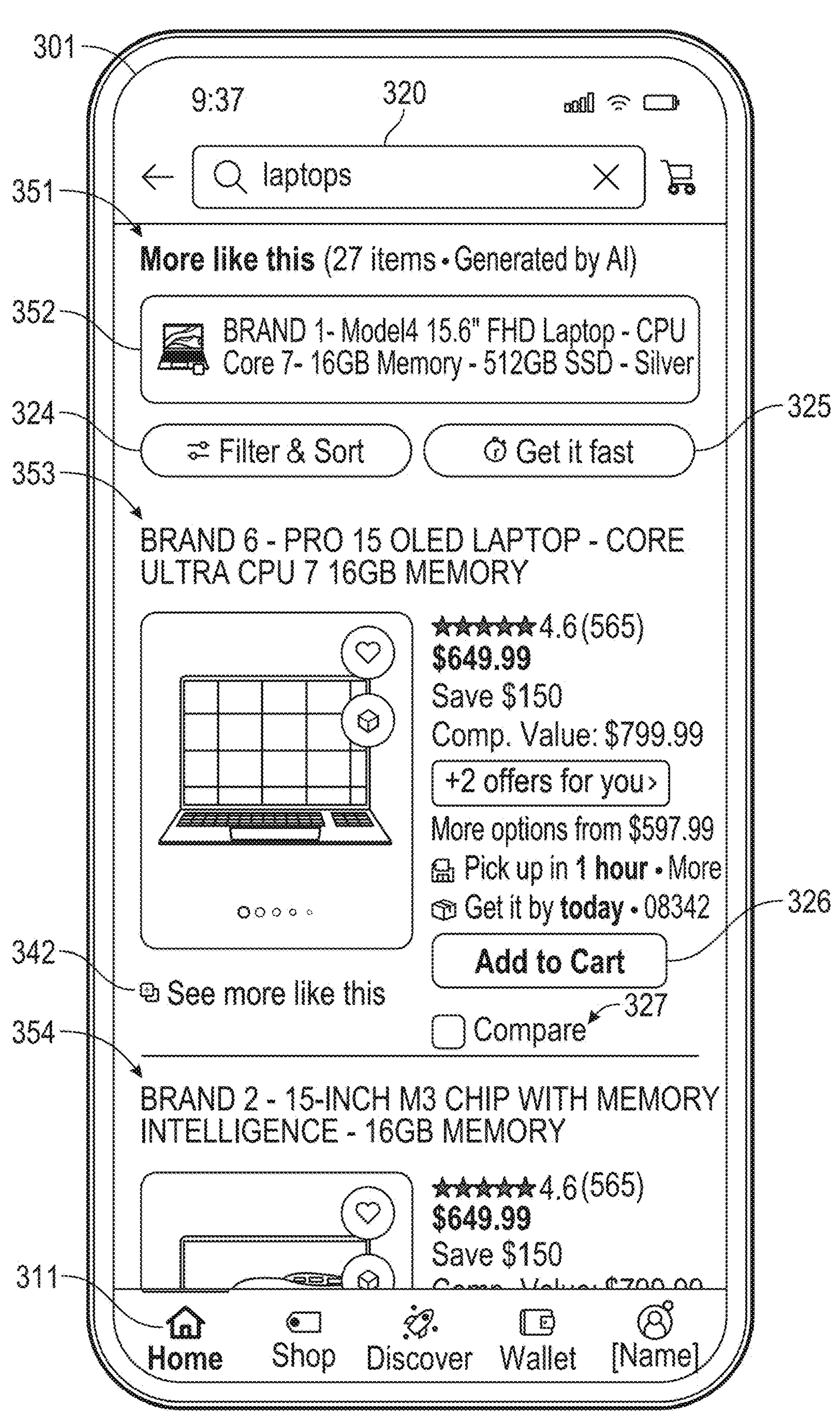

As shown in the example of FIG. 3B, the similarity search functionality 118 can be used to populate a new product listing page (PLP) with the anchor product prominently displayed at the top, followed by a list of related products that sufficiently match the analyzed attributes. This enables an improved user experience by abstracting the recommendation process while eliminating the need for manual user navigation or filtering. Other types of similarity search results may be provided to the user.

The similarity search functionality 118 can also use advanced machine learning models to analyze product attributes and determine similarity, incorporating fallback mechanisms to ensure robust similarity recommendations even when initial criteria yield no results. For instance, if no matching products are found within the original price range or brand constraints, the similarity search functionality 118 can dynamically relax the search parameters to expand the pool of potential recommendations. Furthermore, the similarity search functionality 118 can adapt its recommendations based on user engagement, product relationships, and qualitative aspects of user intent, such as demographic preferences or inferred usage scenarios. By integrating these aspects, the similarity search functionality 118 provides a facet-less discovery experience for similarity searches, enabling users to seamlessly explore similar or related products without the need to apply explicit prompts or selections.

Figure 2:
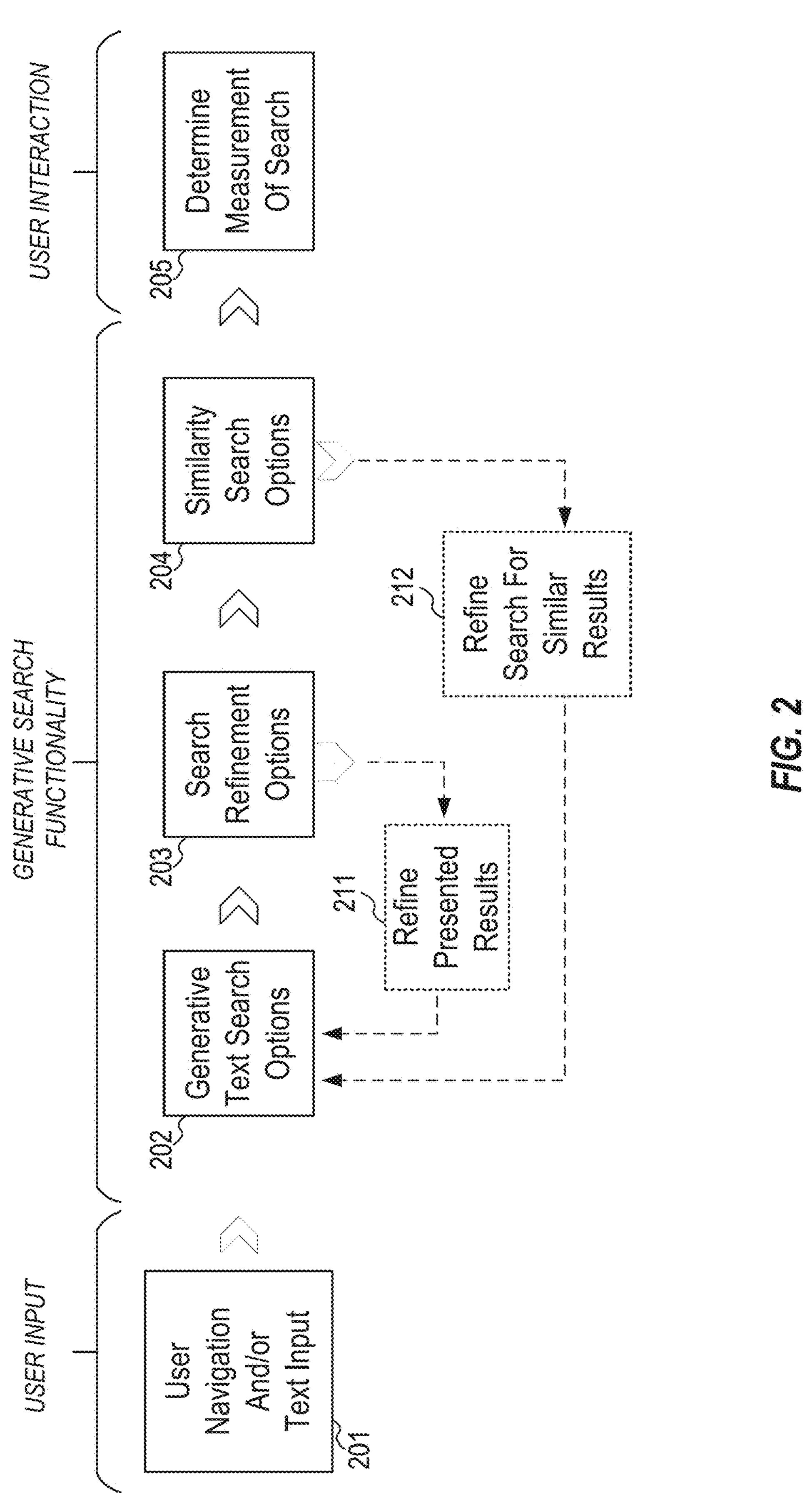
FIG. 2 illustrates a workflow for receiving user input, invoking generative similarity search functionality, and capturing user interaction in connection with an e-commerce content service, according to an example.

FIG. 2 illustrates an example workflow for receiving user input, invoking generative similarity search functionality, and capturing user interaction in connection with an e-commerce content service. This workflow depicts how user input can be used to generate and conduct AI-generated user interface searches, refine searches of the presented results, trigger similarity searches to find results with similar or related attributes, and measure the effectiveness of the search results.

The workflow begins with user navigation and/or text input 201 in a user interface, such as navigation or inputs provided in the user interfaces 121. This input can be in the form of direct text queries (e.g., keyboard entries of words or phrases into text boxes or input fields) or navigational actions within the user interface (e.g., clicking on a keyword or category name).

Upon receiving the user navigation and/or user text input, the workflow conducts generative text searches and provides generative text search options 202. These generative text searches may include various types of AI-generated user interface suggestions based on the user navigation and/or text input 201. For example, suggested search aspects can be generated from one or more AI models and presented to the user in a user interface to guide or refine a search or information retrieval activity. The generative text search options 202 may include search suggestions generated by the AI models to clarify the intent of a search and/or guide a user to perform a search with detailed keywords and phrases. The search options may also include: search suggestions derived from user interactions and trends; search suggestions derived from product features (e.g., identified from curated product reviews, product descriptions, and AI-generated summaries); or search suggestions derived from specific characteristics or features of the product (e.g., identified from technical specifications and product descriptions). Other types of AI-generated search options, suggestions, or recommendations can enhance the search experience by providing contextually relevant options or other information that aligns with inferred user intent or observed user activity.

The workflow can produce search refinement options 203 to further tailor or change the search results. The search refinement options 203 can provide alternative suggested search terms and expanded search queries. The search refinement options 203 can also be selected to update the search parameters or search query and provide updated and personalized search results. In the examples discussed below, these search refinement options include sorting and filtering based on some identified product aspect or attribute.

The workflow can then produce and apply similarity search options 204 to drive the exploration of different but related search results, such as in response to a selection or designation of a "more like this" option. The similarity search options 204 invoke different search terms and/or expanded search queries based on product attributes of an anchor product, to find different search results that may not be found by broad categories and keywords.

Additionally, the workflow can provide mechanisms for applying search changes and refinement after finding a set of similar products, such as refining presented search results 211 and refining the search for similar results 212. For example, in response to invoking the generative text search options 202 and related user actions, additional or different types of selectable search options can be presented. Likewise, in response to the selection of search refinement options 203, additional or different types of selectable options can be presented. Adjustments can be made in response to additional user navigation and input, in some examples with an iterative loop.

The workflow concludes with determining a measurement 205 of user interaction with the search options and resulting search results. The measurements can involve evaluating the effectiveness of the searches in terms of user engagement and conversion rates, and other interactions occurring in connection with an electronic commerce transaction. The workflow, for example, can track which generated search option(s), refinement option(s), and similarity search option (s) led to successful interactions and transactions, and use feedback and training to improve the underlying AI models and the search option generation process.

Figure 4:
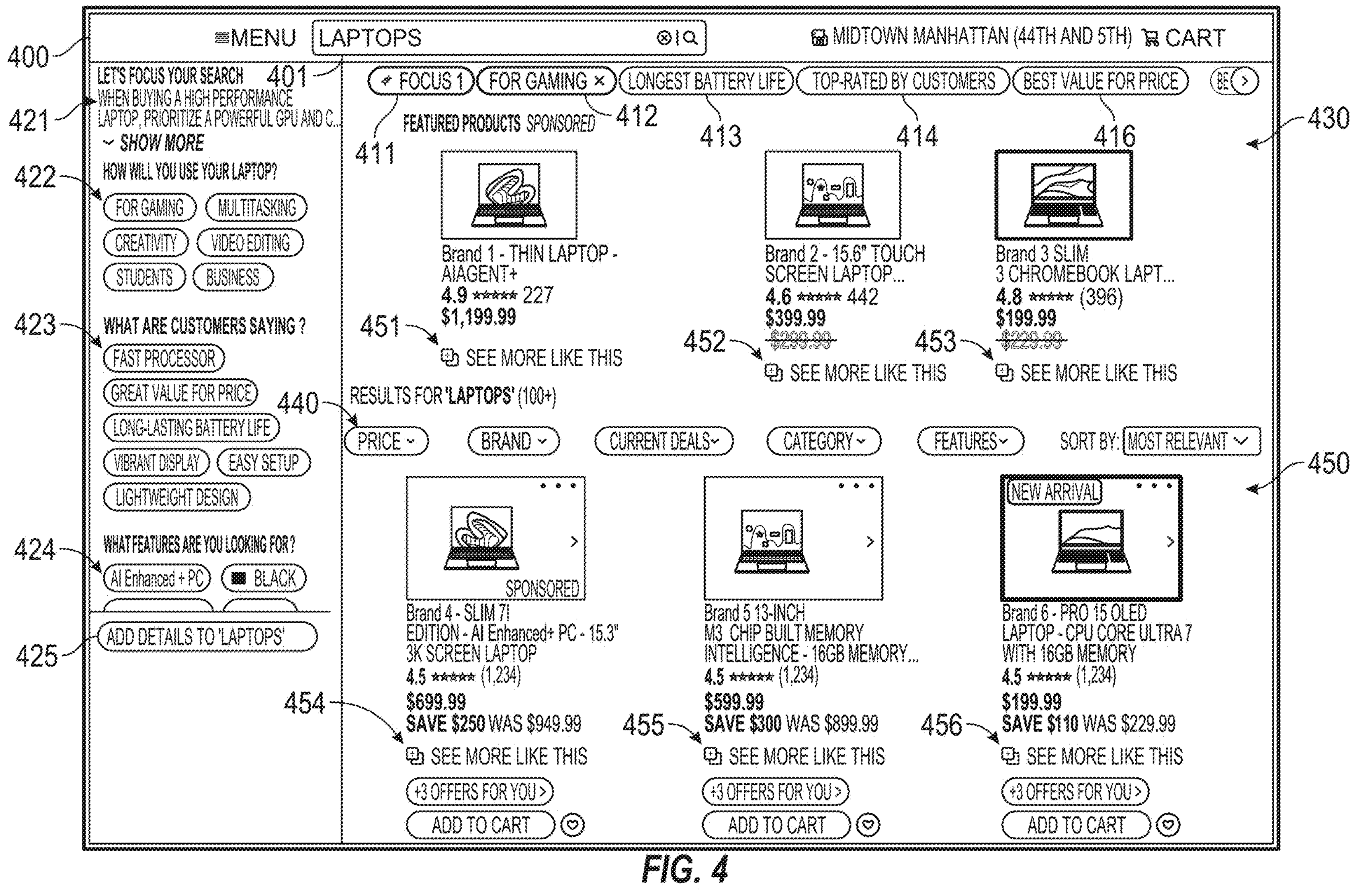
FIG. 4 illustrates a screenshot of a personal computer user interface providing interactions with a generative AI similarity search of an e-commerce content service, according to an example.

FIGS. 3A to 3B illustrate example screenshots of a mobile device user interface (e.g., smartphone app) providing interactions with generative AI similarity search functionality of an e-commerce content service. FIG. 4 illustrates an example screenshot of a corresponding personal computer user interface (e.g., website user interface) providing interactions with the generative AI similarity search functionality. Other types of user interface formats and layouts may be used.

FIG. 3A depicts an example smartphone user interface 301 including functionality that presents the generative text search options 202, the search refinement options 203, and the similarity search options 204 with interactive buttons and user controls. The user interface 301 is depicted as including a navigation bar 311, search bar 320, search options section 321, search results section 322 including a sponsored content sub-section 323, and a similarity search option 341 labeled as "See more like this". Other sections or functionality may be substituted or added to the user interface.

At the top of the user interface 301, the search bar 320 is presented to enable a user to input or modify a keyword search query. In this instance, the user has entered the keyword "laptops" to initiate the search process. Below the search bar 320, multiple suggestions of AI-generated search options (e.g., produced from generative text search options 202) are presented in the search options section 321. The search options section 321 offers personalized options to the user to craft and refine the search query, based on human-understandable concepts.

The search options section 321 depicts multiple selectable options, which may include any combination of user-selectable options relating to social, feature, or precision search options. The search options section 321 depicts the search options as including a "For gaming" option 332 (highlighted when applied), a "Fast charging" option 333, a "Fast processor" option 334, a "Trending deals" option 335, and so on. The search options section 321 also includes an "Add details" or focus option 331 (e.g., button) that allows selections of these and other AI-generated options to be applied and un-applied to the search results. The search options section 321 or other portions of the user interface 301 may provide other suggested search queries such as suggestions of keywords that are fully or partly AI-generated, or based on auto-completed text entered or selected in the search bar.

The search results section 322 of the user interface 301 depicts search results that may be navigated by scrolling or paging in the user interface. In the search results section 322, a limited set of search results (e.g., up to N results) are displayed, showing in this example 23+ results resulting from the AI-generated search. A top search result in the sponsored content sub-section 323 is designated as a "sponsored" result and has a ranking applied to appear at an earlier position (e.g., first position) in the search results.

The search results section 322 may include conventional search result tools such as a sorting and/or filtering selection 324, or a "Get it fast" selection 325 that filters based on product availability. The application of search options (e.g., user-selected options from the search options section 321) and the search result tools (e.g., user-selected searching restrictions applied from the sorting and/or the filtering selection 324) may be combined at the same time. The search results section may include other options to perform comparison or selection operations, such as an add to cart option 326 or compare results option 327.

The search results section 322 of the user interface 301 depicts the presentation of a "See More Like This" similarity search option 341 under each of the product listings. The selection of the similarity search option 341 for a particular product will trigger the search system to perform a similarity search corresponding to the particular product. This similarity search may be performed using only the identifier of the particular product. A result of selecting the similarity search option 341 for the particular product (e.g., a specific laptop model) is shown in FIG. 3B.

In some examples, sponsored results may be designated in the search results section 322 by advertising partners such as product manufacturers, service providers, industry groups, and the like. The generation and selection of the sponsored results may occur as a direct result of AI-generated content or as an accompaniment to AI-generated content (e.g., such as based on sponsorship of particular related attributes, keywords, terms, or phrases). The use of sponsored listings may be monetized in scenarios where product or service sellers purchase exclusive rights to search options or search results that direct end users (product or service customers) directly to a group of one or more sponsored products (e.g., "Best laptops for college"). As will be understood, various controls can be placed to limit how many brands, products, or services can appear in a set of sponsored search options or similarity search results at the same time. Any user interaction with the sponsored search options or similarity search results can be tracked and managed in a similar manner to other advertising campaigns and the use of advertising technologies.

Next, FIG. 3B depicts a variation of the user interface 301, where one of the products has been selected as an anchor product and used for driving a similarity search. A search for the term "laptops" is continued to be performed, but with the additional qualification of laptops that have attributes similar to the product associated with the similarity search option 341 that was selected. This provides a new set of search results including a first product listing 353, a second product listing 354, and other product listings (not visible on-screen).

The similarity search results 351 are identified to be "more like this" based on a representation 352 of the anchor product. The similarity search results 351 also show that more search results are identified than provided by the original search. For instance, in the depicted examples, 23 products were identified in the original search results (shown in FIG. 3A), but 27 products were identified in the similarity search results (shown in FIG. 3B). The similarity search may be additive, subtractive, restrictive, or apply other criteria to generate different combinations of results.

Other functionality may be provided to refine the search and interact with the similarity search results, such as with the sorting and/or filtering selection 324, the "Get it fast" selection 325, the add to cart option 326, or the compare results option 327. The functionality may also include options to trigger new similarity searches. For instance, under the first product listing 353, another similarity search option 342 is presented with the text "See more like this", which causes this product to serve as a new anchor product for the similarity search. Other similarity search options may be presented under the respective search results.

FIG. 4 illustrates an example screenshot of a website user interface 400, such as an interface provided in a web browser, providing interactions with a generative AI similarity search of an e-commerce content service. Similar to the discussion of the user interface 301 provided above, the website user interface 400 includes a search bar 401 that enables a search keyword to be entered and changed. The website user interface provides a search results section 450 to display matching results of the search query and a featured products section 430 to display sponsored or featured products relevant to the search query.

The website user interface 400 presents a product listing page with multiple search options to be applied, including search strategy text 421, feature search options 422, social search options 423, precision search options 424, and a search refinement entry 425. In addition to presenting these user interface options in a dedicated area of the user interface, the website user interface 400 also presents selected options above the search results. For example, a focus selection 411 (e.g., button) can allow a selected list of user interface search options to be activated or deactivated for the featured products section 430 and the search results section 450.

As shown, the selected user interface search options include a first search refinement selection 412 (e.g., "For Gaming"), a second search refinement selection 413 (e.g., "Longest Battery Life"), a third search refinement selection 414 (e.g., "Top-Rated by Customers"), and a fourth search refinement selection 416 (e.g., "Best Value for Price"). Additional search filters and sorting tools 440 may be provided in the website user interface 400 and applied to the search results section 450.

Multiple options are presented across the user interface to invoke a similarity search based on similarity to a particular featured product. For instance, this is shown under respective featured product listings with "See More Like This" option 451, option 452, and option 453. The selection of any of these options will trigger a new similarity search (and present a new product listing page) based on the identifier of the corresponding selected product.

Similarly, the search results section 450 presents respective product listings with "See More Like This" option 454, option 455, and option 456. The selection of any of these options will trigger a new similarity search (and present a new product listing page) based on the identifier of the corresponding selected product.

Figure 5:
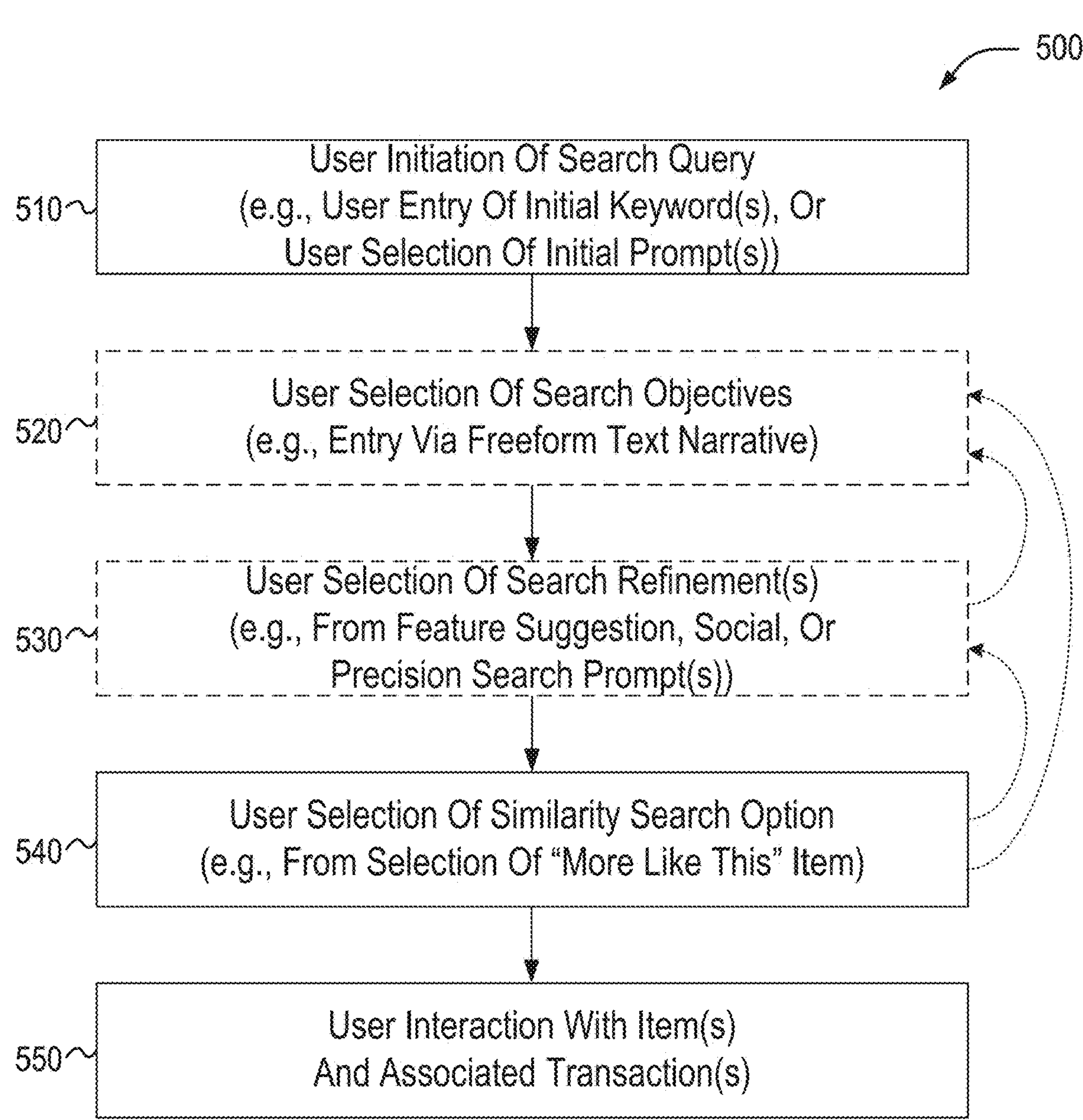
FIG. 5 illustrates a flowchart of a workflow for presenting generative similarity search results in an e-commerce setting, according to an example.

FIG. 5 illustrates a flowchart 500 of an example workflow for presenting generative similarity search results. For instance, the flowchart 500 can be implemented by a computing system to enhance or control the user interface functionality presented above in user interfaces 301 and 400. The flowchart 500 specifically outlines a sequence of operations that guide the user from initiating a search query (operation 510) to interacting with items (operation 550) and completing associated transactions, while applying search options, inputs, and refinements to interact with the search query results.

At operation 510, the user initiates a search query. This initiation can occur through the entry of initial keyword(s) or phrase(s) in a user interface, or by selecting an initial search option provided in the user interface. At operation 520, the user optionally selects one or more search objectives. This selection can be made through the entry of a freeform text narrative, or based on a selected user history or selected type of product, allowing the user to specify detailed or nuanced search goals or objectives to find particular items.

At operation 530, the user optionally selects search refinements. These refinements can be chosen from feature suggestion search options, social search options, or precision search options, among other refinements. The search refinements can be selected to narrow, expand, or change the search results based on specific criteria or objectives. The search query and search objectives can be updated based on the specific combination of search refinements that are selected to be applied.

At operation 540, the user selects a similarity search option such as from clicking or activating a "See More Like This" option for a selected item. This generates a new set of search results and product listings, such as presented in a new product listing page. The similarity search may apply various constraints that limit the number of results, such as constraints relating to a same product or service type as the selected item, a same brand as the selected item, being priced within a predetermined price range (e.g., above or below the selected item), or an availability status (e.g., having an in-stock or scheduling availability).

In other operations (not shown), the user can optionally select applicable options such as one or more facet(s), filter(s), feature(s), or sorting options to be applied to the search results and/or the similarity search results. This can apply additional tools for the user to further limit, change, or refine the presentation of the search results in the user interface. In some examples, user-applied facets, filters, features, or sorting options can influence the available search refinements, search objectives, or similarity criteria. Thus, although the present techniques for similarity searching do not require the use of facets or filters, the resulting availability and direction of a similarity search can be enhanced based on user inputs and interactions with facets, filters, features, or sorting options.

At operation 550, the user interacts with the items and completes associated transactions. This operation can include the user engaging with the search results in the user interface, such as by viewing, selecting, or purchasing items. The user interactions can be tracked and analyzed, as discussed in more detail below.

Figure 6:
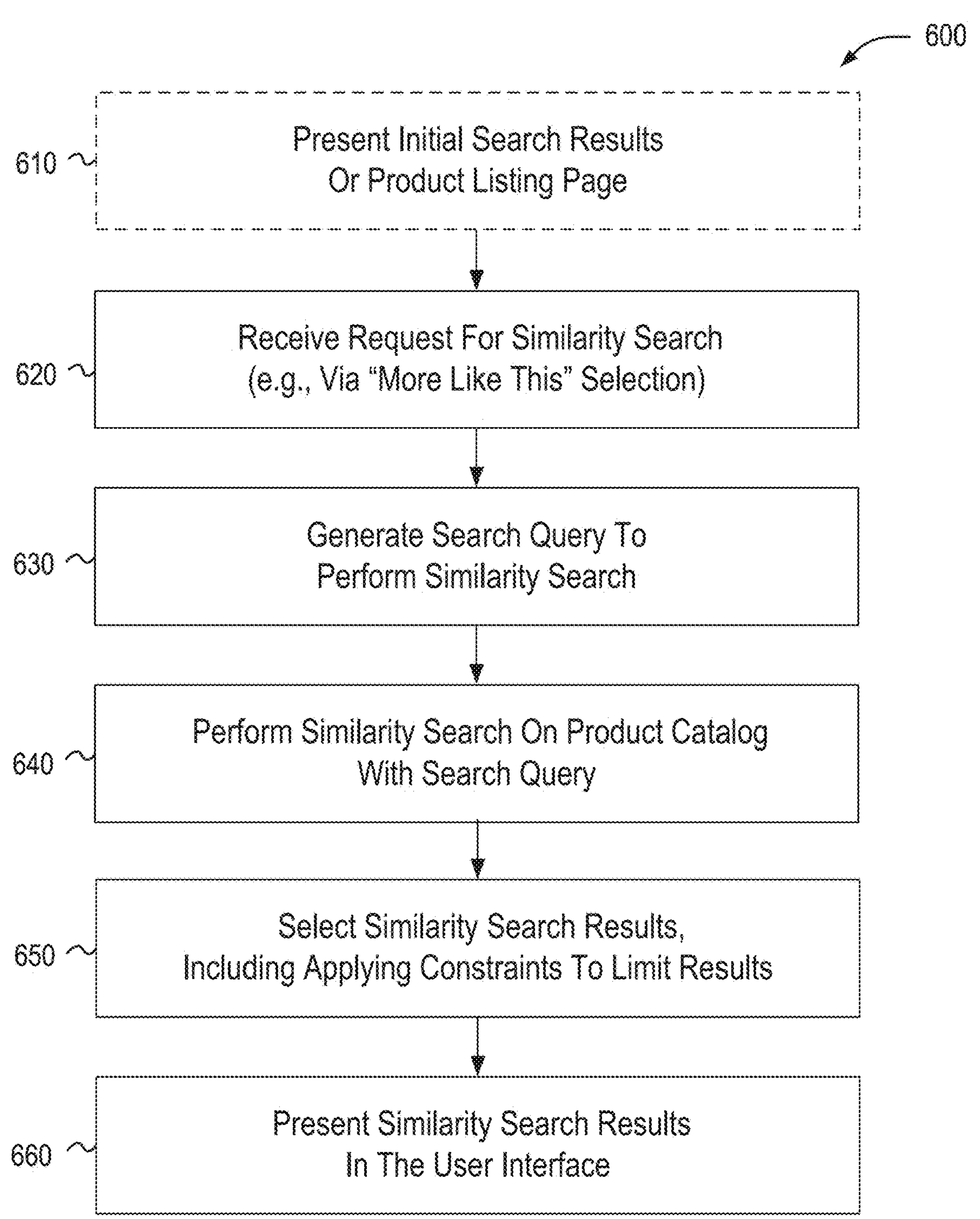
FIG. 6 illustrates a flowchart of a method for performing a similarity search assisted by a generative AI model, according to an example.

FIG. 6 illustrates a flowchart 600 of an example method for performing a similarity search assisted by a generative artificial intelligence (AI) model. This method may be performed by the content service 110 discussed above, or similar services or functionality to operate search and content services for a user interface.

The following walkthrough of an example usage of the similarity search is provided with reference to the user selection of a "More Like This" option corresponding to a selected product. It will be understood, however, that other user interactions or automated operations may be used to invoke or start a similarity search. The similarity search can also be configured per-product type and per-customer, with the results being personalized to the customer or a particular group associated with the customer.

Operation 610 begins with an optional step of presenting initial search results or a product listing page, before receiving a request for the similarity search. For example, an initial product search based on a keyword or phrase may include generative AI-assisted searches, such as by: receiving a search request of a product catalog, based on a search request provided from a user that includes at least one keyword or phrase; generating a product search query to perform the search request, using at least one AI model; and presenting a plurality of product search results in response to the product search query. Other types of searches or presentations of product listings may also be provided.

Operation 620 includes receiving a request for a similarity search, such as via a user selection of a "more like this" option from a user interaction received in a user interface (e.g., a request from a user provided by clicking a link or selecting a button on a product listing page). This request for the similarity search provides a product identifier (e.g., a stock keeping unit (SKU) number) of a corresponding selected product (an "anchor product"), from which the similarity search will be initiated. For instance, the user selection of a "More Like This" link as depicted in FIG. 3A, FIG. 3B, or FIG. 4 can initiate the similarity search based on the corresponding selected product.

Operation 630 includes generating a search query to perform the similarity search, using at least one AI model. The AI model generates this search query based on attributes associated with the selected product that are identified by the AI model. In an example where an initial search has been performed, the AI model identifies the attributes to perform the similarity search based on additional information (additional to the product identifier) including: (i) the at least one keyword or phrase associated with the search request, (ii) a search intent associated with the search request, and (iii) user activity associated with the search request. This information helps direct the similarity search in a direction that is consistent with the initial search.

Operation 640 includes performing the similarity search with the generated search query on a product catalog. This similarity search may be performed using the keywords or phrases generated by the AI model. Navigation history and/or user demographic information may also be evaluated and used by the AI model in performing the similarity search. For instance, targeted customer audiences may be evaluated based on a given business campaign's objective and a customer's interaction and transaction history.

In one example, the AI model includes a generative large language model that evaluates attributes associated with the selected product to determine a search intent, to then generate at least one keyword or phrase used for identifying the similarity search results based on the determined search intent. In another example, the AI model includes a predictive model that generates or refines the search query to perform the similarity search based on dynamic context information associated with: profile information associated with a user; interactions observed in the user interface; or a search intent associated with an earlier search performed in the user interface.

Operation 650 includes selecting similarity search results in response to performing the similarity search on the product catalog. This selection may include applying one or more constraints to limit the number of results in the similarity search results. In an example, the one or more constraints define requirements for selection of one or more products, such as products that are: a same product type as the selected product; a same product brand as the selected product; within a predetermined price range above or below the selected product; or, having an in-stock (or location-specific pickup or fulfillment) availability.

In some examples, the selection of the similarity search results includes evaluating a number of the results in the similarity search, in response to applying the one or more constraints. This may result in relaxing the application of the one or more constraints to increase the number of the results in the similarity search, in response to the number of the results not satisfying a minimum number of results. Alternatively, this may result in strengthening the application of the one or more constraints to decrease the number of the results in the similarity search, in response to the number of the results exceeding some maximum number of results.

In other examples, the similarity search constraints can be based on additional characteristics of the search results, to expand the search results with exact, supplementary, and/or complementary matches. These constraints may be based on strategic merchandising or promotional business decisions. For example, if a customer searches for a particular brand of television that is commonly low cost or inexpensive, the search constraints may be expanded to promote alternate brands of televisions instead that have a similar cost.

Operation 660 includes presenting the similarity search results in the user interface. These similarity search results include one or more products identified as similar to the anchor product. In an example, the presenting the similarity search results in the user interface includes presenting, in a product listing page, a listing of the one or more products identified as similar to the selected product, and presenting, in a top section of the product listing page, an identification of the selected product as an anchor product (e.g., the anchor product identified as the starting point of the similarity search).

Additional operations (not depicted in FIG. 6) may include, after presenting the similarity search results in the user interface, presenting one or more search refinement options applicable to the similarity search results, and outputting narrowed search results to be presented in the user interface based on applying the search refinement options. These search refinement options can be selected and used to generate narrowed search results based on applying the selected refinement options to the similarity search results.

Figure 7:
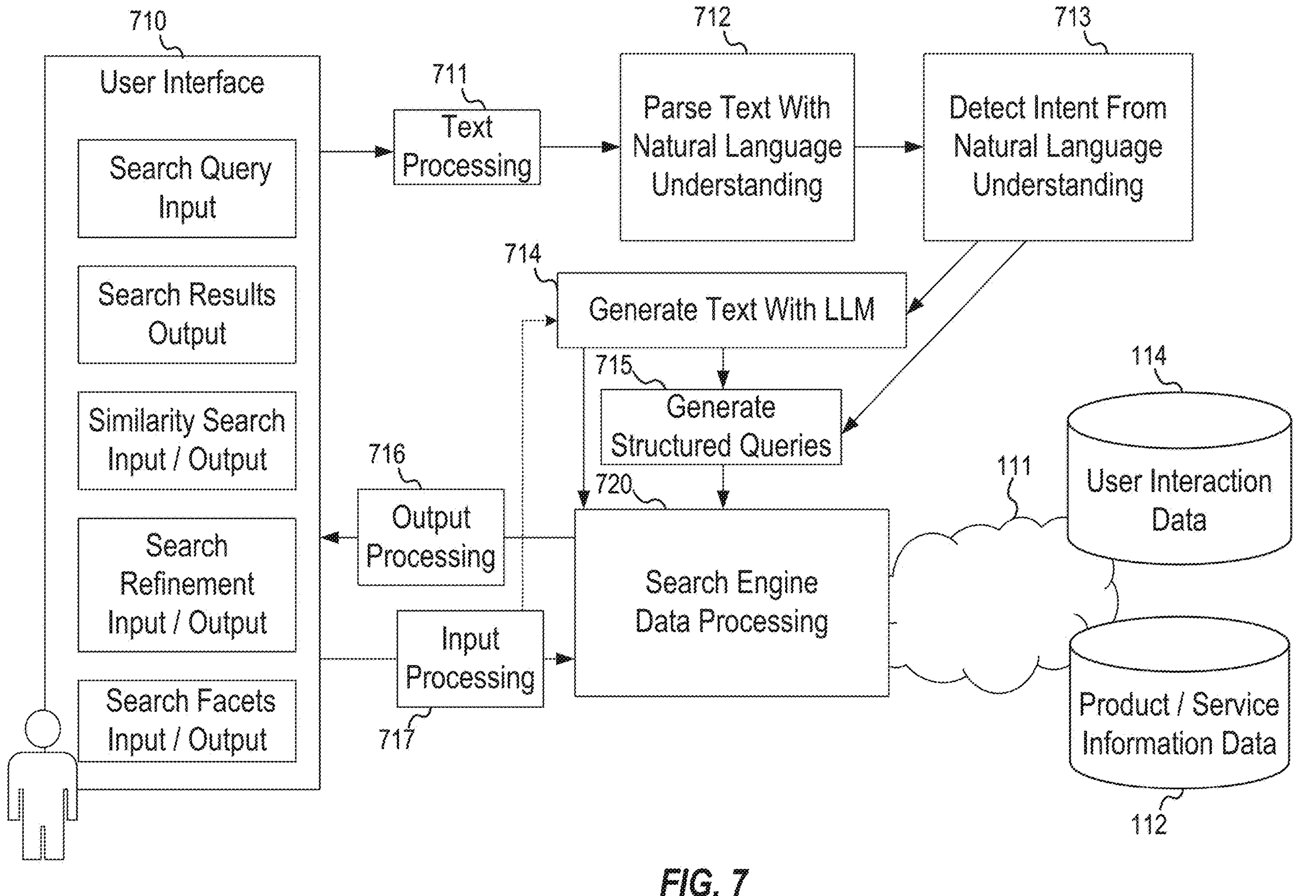
FIG. 7 illustrates a simplified data flow schematic for generative search and similarity search functionality provided in an e-commerce content service, according to an example.

FIG. 7 illustrates a simplified data flow schematic for generative search and similarity search functionality provided in an example e-commerce content service. This search functionality may be provided using the inputs and outputs discussed above in the user interfaces of FIGS. 3A, FIG. 3B, and FIG. 4. Detailed data flows and architectural details used in example search operations with the commerce content service follow in FIG. 7 to FIG. 8.

In FIG. 7, an instance of the user interface 710 provides input and output functionality to implement generative search and generative search refinement, including: search query input, search results output, search refinement input and output, and search facets input and output. The user interface 710, for instance, may enable the user input operations referenced above for FIG. 2 and FIG. 5.

The search query input entered by the user can be provided for initial text processing 711, which provides text to be parsed with natural language understanding 712. Relevant search query characteristics such as search intent can be detected from the natural language understanding 713.

The text and the search intent are used to generate additional text with an LLM 714, and to generate structured search queries 715 as expanded by the additional text. The generative text and these structured search queries are provided to the search engine data processing 720. The search engine data processing 720 utilizes the cloud service 111 and the accompanying product and service information data 112 and user interaction data 114 to perform searches and produce search results.

The search results produced by the search engine data processing 720 can provide outputs 716 to be presented in the user interface 710, including the presentation of the search results, selectable search refinements, and selectable search facets. Inputs 717 such as selection, de-selection, and other interaction with the search refinements and the search facets can be provided back to the search engine data processing 720 to facilitate updated and refined searches.

Figure 8:
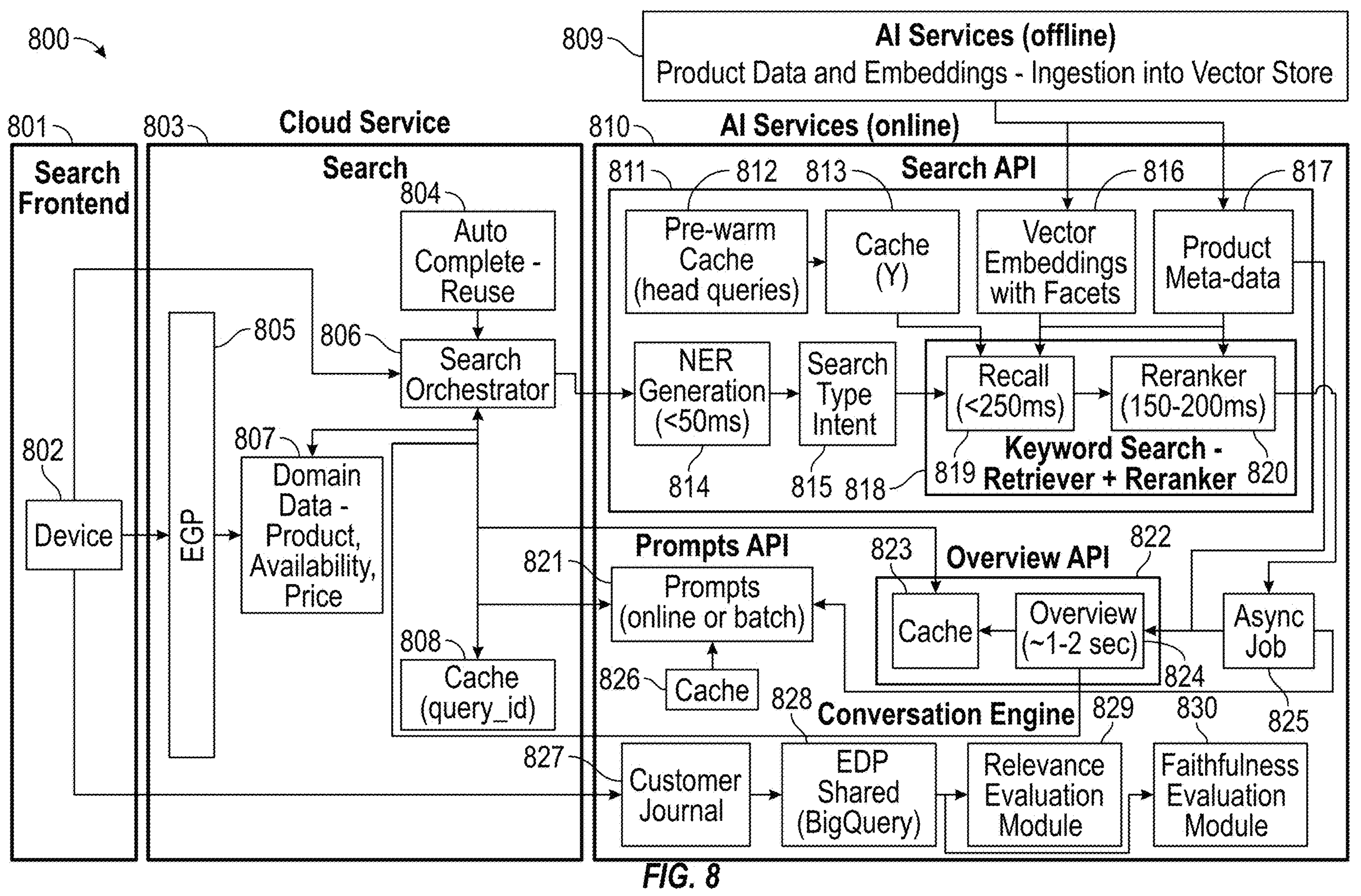
FIG. 8 illustrates a block diagram of a detailed system configuration for providing generative search and similarity search functionality in an e-commerce content service, according to an example.

Although only one LLM is depicted in FIG. 7 and FIG. 8, multiple models may be used to generate text and structured queries for any type of generative search discussed herein. Additionally, a similarity search may involve performing named entity recognition (NER) (e.g., by identifying and classifying key entities in text), evaluating confidence in the understanding of customer intent, and then performing a recall of relevant search results. This is shown in the elements of the following system diagram.

FIG. 8 illustrates a block diagram of a detailed system configuration 800 for providing generative search and similarity search functionality in an example e-commerce content service. This detailed system configuration 800 is divided into a search frontend 801 (e.g., provided by the user interfaces discussed above, as operated on a user device 802), a cloud service 803, and AI services systems 809 and 810. Other system architectures may be used to implement the presently described search functionality.

The search frontend 801 serves as an initial interface for user interaction with the generative search system. The search frontend 801 is responsible for capturing user inputs, such as search queries (e.g., keywords or phrases), and transmitting these inputs to the underlying components for processing. For instance, the search frontend 801 may be activated by a user device 802, which can be any user-operated hardware, such as a smartphone, tablet, or computer, facilitating the entry of search queries and the display of search results. The search frontend 801 may also be activated by the selection of a "more like this" similarity search command in a user interface.

The cloud service 803 provides an infrastructure to support search operations and deliver search content back to the user device 802. The cloud service 803 is depicted as hosting various components, including an EGP 805 (a data orchestration platform that uses Graph QL), a search orchestrator 806, a search auto-complete function 804, a domain data function 807, and a cache 808. The cloud service 803 manages data flow between the frontend and backend components, ensuring user queries are processed efficiently and relevant results are retrieved. The cloud service 803 may use distributed computing resources to handle large volumes of data and complex processing operations, providing scalability and reliability to the generative search system.

The offline AI services system 809 can operate ahead of time (before a user search operation) to process product data and embeddings, ingesting these into a vector store for efficient retrieval. This system can operate independently of real-time user interactions by preparing and organizing data for use by the online AI services. The online AI services system 810 offers real-time processing capabilities, utilizing AI models to generate search refinements and suggestions in response to specific user queries.

The online AI services system 810 operates a search API 811 to apply AI-driven logic to user queries. The search API 811 includes cache functionality, including a pre-warm cache 812 and an expanded cache 813 to pre-load frequently accessed queries into cache memory and to assist a recall function 819 and ranking function 820 of a keyword search function. The keyword search function receives search inputs from the cloud service 803 and performs named entity recognition 814 (NER) operations and search type intent analysis 815 on the search inputs, to determine relevant keyword terms for searching. The keyword search function may utilize the caches, vector embeddings 816, and product metadata 817 to perform search queries and rank search results using the keyword terms.

The recall function 819 and ranking function 820 can provide clustering with a high degree of precision for the similarity search, based on as little search input as a single SKU or another product identifier. For a similarity search, the online AI services system 810 can choose a diverse set of product attributes per product type corresponding to this identifier, such as in a scenario where the attribute selection can vary between two related types (e.g., type: televisions and type: movies). In addition, for a similarity search, the online AI services system 810 can identify additional similarity search results based on compatible product recall, such as to suggest TV mounts for television searches, cases for smartphone searches, and the like.

The online AI services system 810 also operates a prompts API 821 and an overview API 822. The prompts API 821 may include a cache 826 for the search refinements, and the overview API 822 may include a corresponding cache 823 for overview content functions 824. An asynchronous job 825 may be used to generate the user interface search options or the overview content.

The online AI services system 810 also operates a conversation engine including components such as a customer journal 827, an enterprise data platform 828, relevance evaluation functions 829, and faithfulness evaluation functions 830. The conversation engine can track and store various customer actions and perform relevance evaluations and faithfulness evaluations to determine if the search queries and search refinements were successful.

Figure 9:
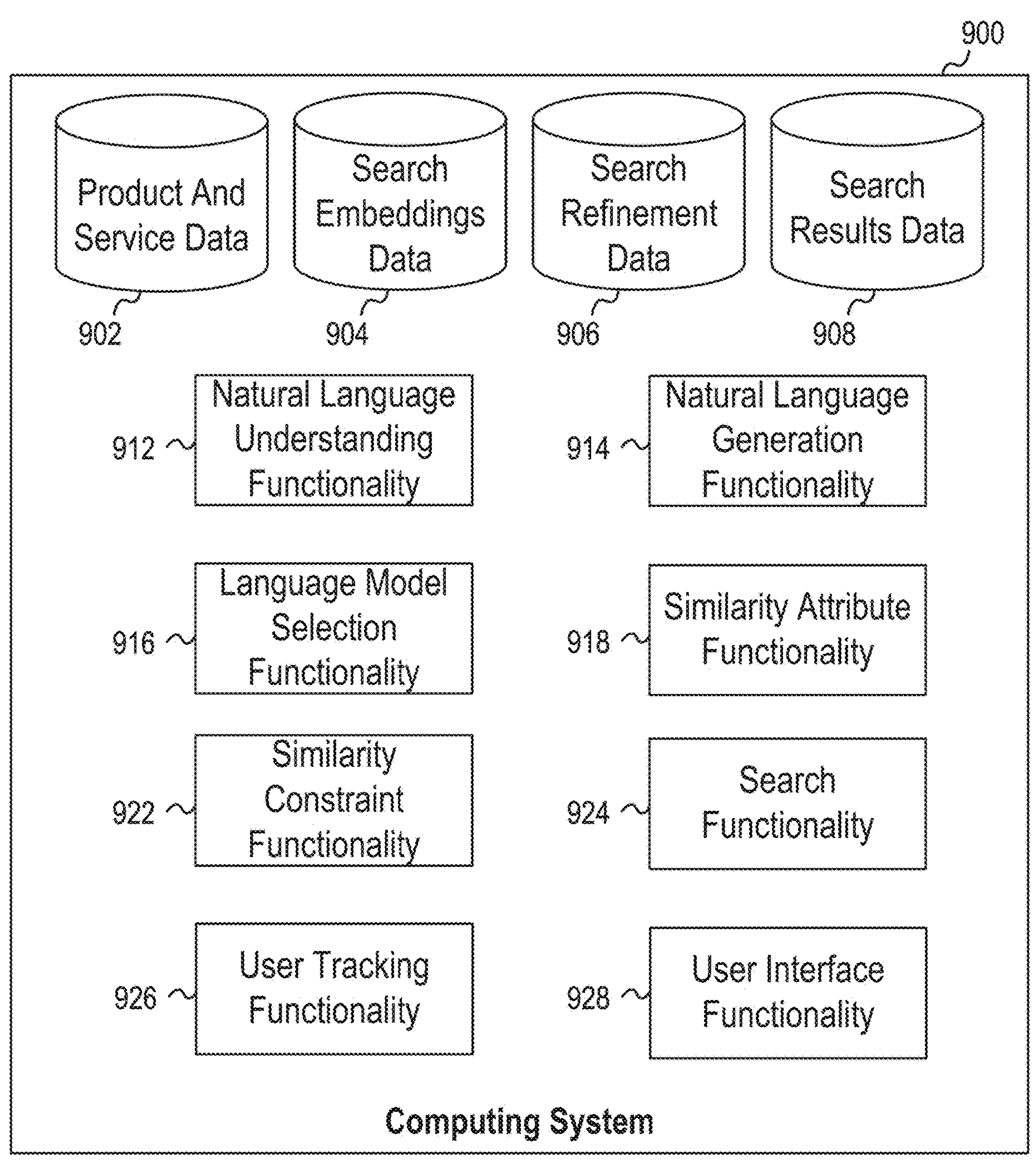
FIG. 9 illustrates a block diagram of computing system components for implementing a generative search system, according to an example.

FIG. 9 illustrates a block diagram of hardware and functional components of a computing system 900 to implement the content service 110, and to perform the search examples and functionality described above. It will be understood, that although certain hardware and functional components are depicted in FIG. 9 and in other drawings as separate subsystems or services, the features of the subsystems or services may be integrated into a single or combined system or service (e.g., accessible via an application programming interfaces hosted by a server computing system, or in a software package executable by a computing device). Further, although only one computing system is depicted, it will be understood that the features of these systems may be distributed among one or multiple computing systems, including in cloud-based or other distributed computing processing settings.

As shown, the computing system 900 includes various subsystems 912-928 used to implement functionality for similarity searches (e.g., to provide the workflows depicted in FIG. 2, operate the user interfaces of FIG. 3A, FIG. 3B, and FIG. 4, facilitate the operations of FIG. 5 and FIG. 6, and implement the components of FIG. 7 and FIG. 8). The computing system 900 also includes data stores (e.g., databases) of data 902-908 to store and access data associated with the content service 110 and the resulting search results and functionality.

The data maintained in the computing system 900 for enabling generative and similarity searches may include the following. First, product and service data 902 can be maintained to store particular characteristics and properties of discrete items, including but not limited to features and technical specifications, product reviews, social activity such as user reviews associated with an item, pricing information, etc. Second, the search embeddings data 904 can be maintained to store representations of relevant data to be analyzed and used by a large language model. Third, the search refinement data 906 can be maintained to store and track applicable search refinements that are applied to particular search queries and search results. Fourth, the search results data 908 can be maintained to store and track search result listings, including user interaction with individual items in the search results.

In an example, the computing system 900 is adapted to execute respective software applications that implement the functionality subsystems and databases through multiple processing components and functionality, such as via circuitry and software instructions. In an example, the computing system 900 is adapted to implement respective functional components including: natural language understanding functionality 912 operable to interpret the intent of natural language text, using an LLM or another AI model; and natural language generation functionality 914 operable to generate or produce text, using an LLM or another AI model. In some examples, separating the natural language understanding from natural language generation tasks assists with workflows for intent detection based on user questions and responses. The computing system 900 can be adapted to engage the natural language generation functionality 914 after the search intent is understood and the search action is identified as a supported context. This can help ensure that generated responses are within a contextual boundary while reducing the chance of LLM hallucination.

The computing system also includes language model selection functionality 916, which provides capabilities to combine the use of LLMs with smaller AI models. For example, instead of sending every user query or question directly to an LLM, the language model selection functionality 916 may invoke a smaller model to detect what the user is looking for. The query can also be placed into a structured format with another AI model, to be matched with relevant results (products or services).

The computing system also includes similarity attribute functionality 918, which can be used to determine and evaluate attributes of products or services in connection with a similarity search. The similarity attribute functionality 918 may use one or more generative AI models to generate new search queries based on product or service attributes, to appropriately focus and tailor the similarity search without the use of user-applied filters, facets, or manually applied search refinement options.

The computing system also includes similarity constraint functionality 922, which can be used to expand or constrict the similarity searches and similarity search results. As noted above, the constraints may be based on particular requirements, rules, or matching criteria, such as to require some combination of: a same product type; a same product brand; in-stock or pick-up product availability; within a predetermined price range (e.g., within 50% above or below the starting product). Other types of constraints may be applied.

The computing system 900 also includes search functionality 924, which can be used to coordinate the generative search and refinement operations as discussed above (e.g., as detailed in the schematics of FIG. 7 to FIG. 8). The search functionality 924 may be divided into multiple subsystems and coordinated with multiple types of caches.

The computing system 900 also includes user tracking functionality 926, which can provide adaptive tracking and measurement based on the results of the generative search and/or the similarity search. For example, the user tracking functionality 926 can be used to adapt to characteristics tracked for both engagement and conversion, while collecting data relevant to retraining and improving models accordingly. In addition, the user tracking functionality 926 can determine changes to be made to an AI model (or uses of the AI model) on account of findings from testing and measurement.

The computing system 900 also includes user interface functionality 928, used to generate and customize various user interface outputs and receive user interface inputs, relating to the presentation of content and user interaction. Examples of such user interfaces include those discussed above with reference to FIG. 3A, FIG. 3B, FIG. 4, and other user interface functionality discussed above.

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
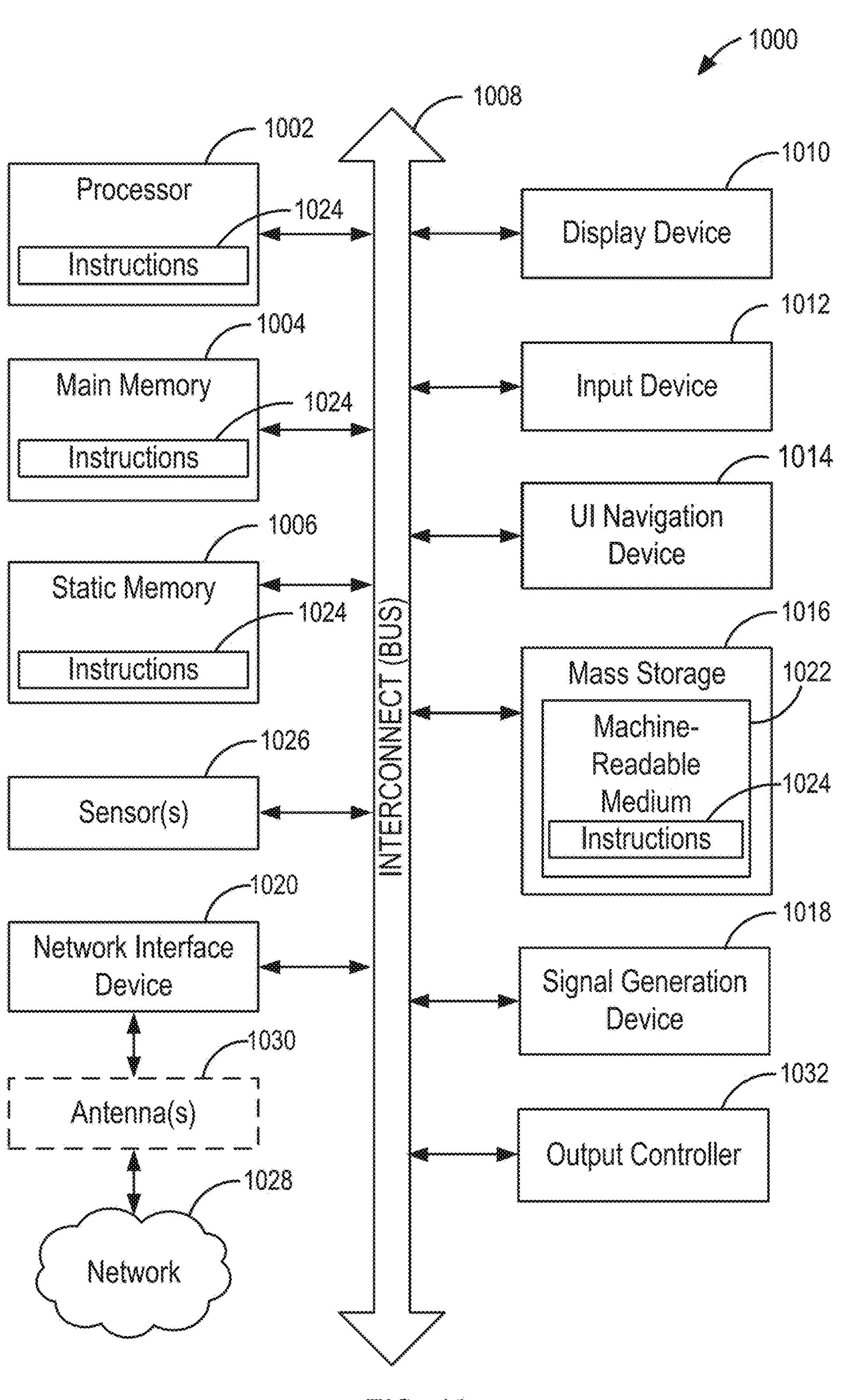
FIG. 10 illustrates a block diagram of operational components of a computing system upon which any one or more of the techniques herein discussed may be executed and implemented.

FIG. 10 illustrates a block diagram illustrating a machine in the example form of a computer system machine 1000, within which a set or sequence of instructions may be executed to cause the machine to perform any one of the methodologies discussed herein, according to an example. Computer system machine 1000 may be embodied by the computing system 900; the subsystem(s) implementing the data stores for data 902, 904, 906, 908; the subsystem(s) implementing the various components or functionality 912, 914, 916, 918, 922, 924, 926, 928; the subsystem(s) implementing the content service 110, cloud service 803, AI services systems 809 or 810, or data processing 720; the computing devices such as mobile device 123, personal computing device 124, mobile device 125, or user device 802; the device or system implementing the user interfaces 301, 400, 710; or any other electronic processing or computing platform described or referred to herein. Further, the computer system machine 1000 may embody instructions and data to perform any of the interfaces or functions referenced for FIGS. 1-9.

Example computer system machine 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system machine 1000 may further include a video display unit 1010, an alphanumeric input device 1012 (e.g., a keyboard), and a user interface (UI) navigation device 1014 (e.g., a mouse). In one example, the video display unit 1010, input device 1012, and UI navigation device 1014 are incorporated into a touchscreen interface and touchscreen display. The computer system machine 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system machine 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile and wired telephone networks, and wireless data networks (e.g., Wi-Fi, 3G, 4G LTE/LTE-A, 5G, or Satellite communication networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a method for performing a similarity search assisted by a generative artificial intelligence (AI) model, the method comprising operations executed using at least one processor of a computing device, and the operations comprising: receiving a request for a similarity search, wherein the request for the similarity search is provided in response to a user interaction received in a user interface, and wherein the request for the similarity search includes a product identifier of a selected product; generating a search query to perform the similarity search, using at least one AI model, wherein the at least one AI model generates the search query based on attributes associated with the selected product that are identified by the at least one AI model; performing the similarity search with the generated search query on a product catalog; selecting similarity search results in response to performing the similarity search on the product catalog; and presenting the similarity search results in the user interface, wherein the similarity search results include one or more products identified as similar to the selected product.

In Example 2, the subject matter of Example 1 optionally includes wherein the user interaction is a request from a user for a new search to present new products more like the selected product, wherein the product identifier is a stock keeping unit (SKU) number, and wherein the user interaction is received with a button or link presented in the user interface to initiate the similarity search based on the selected product.

In Example 3, the subject matter of any one or more of Examples 1-2 optionally include the operations further comprising: applying one or more constraints to limit results in the similarity search results, wherein the one or more constraints define requirements for selection of: one or more products of a same product type as the selected product; one or more products of a same product brand as the selected product; one or more products within a predetermined price range above or below the selected product; or one or more products with an in-stock availability.

In Example 4, the subject matter of Example 3 optionally includes the operations further comprising: evaluating a number of the results in the similarity search, in response to applying the one or more constraints; and relaxing an application of the one or more constraints to increase the number of the results in the similarity search, in response to the number of the results not satisfying a minimum number of results.

In Example 5, the subject matter of any one or more of Examples 1~4 optionally include the operations further comprising, before receiving the request for the similarity search: receiving, in the user interface, a search request of the product catalog, the search request including at least one keyword or phrase received in the user interface; generating a product search query to perform the search request, using the at least one AI model; and presenting, in the user interface, a plurality of product search results in response to the product search query; wherein the plurality of product search results includes the selected product, and wherein the request for the similarity search is performed with a user selection received in the plurality of product search results.

In Example 6, the subject matter of Example 5 optionally includes wherein the at least one AI model identifies the attributes to perform the similarity search based on additional information including (i) the at least one keyword or phrase associated with the search request, (ii) a search intent associated with the search request, and (iii) user activity associated with the search request.

In Example 7, the subject matter of any one or more of Examples 1-6 optionally include wherein presenting the similarity search results in the user interface includes: presenting, in a product listing page, a listing of the one or more products identified as similar to the selected product; and presenting, in a top section of the product listing page, an identification of the selected product as an anchor product.

In Example 8, the subject matter of any one or more of Examples 1-7 optionally include wherein the at least one AI model includes a generative large language model, and wherein the at least one AI model evaluates attributes associated with the selected product to determine a search intent, and generate at least one keyword or phrase used for identifying the similarity search results based on the determined search intent.

In Example 9, the subject matter of any one or more of Examples 1-8 optionally include wherein the at least one AI model includes a predictive model, and wherein the predictive model generates or refines the search query to perform the similarity search based on dynamic context information associated with: profile information associated with a user; interactions observed in the user interface; or search intent associated with an earlier search performed in the user interface.

In Example 10, the subject matter of any one or more of Examples 1-9 optionally include the operations further comprising, after presenting the similarity search results in the user interface: presenting one or more search refinement options applicable to the similarity search results; receiving a selection of the one or more search refinement options; generating narrowed search results based on applying the selected refinement options to the similarity search results; and outputting the narrowed search results to be presented in the user interface.

Example 11 is a non-transitory computer-readable storage medium, the computer-readable storage medium comprising instructions that, when executed by processor circuitry and memory of a computing device, causes the computing device to provide similarity search results via a user interface, with operations that: receive a request for a similarity search, wherein the request for the similarity search is provided in response to a user interaction received in a user interface, and wherein the request for the similarity search includes a product identifier of a selected product; generate a search query to perform the similarity search, using at least one AI model, wherein the at least one AI model generates the search query based on attributes associated with the selected product that are identified by the at least one AI model; perform the similarity search with the generated search query on a product catalog; select similarity search results in response to performing the similarity search on the product catalog; and present the similarity search results in the user interface, wherein the similarity search results include one or more products identified as similar to the selected product.

In Example 12, the subject matter of Example 11 optionally includes wherein the user interaction is a request from a user for a new search to present new products more like the selected product, wherein the product identifier is a stock keeping unit (SKU) number, and wherein the user interaction is received with a button or link presented in the user interface to initiate the similarity search based on the selected product.

In Example 13, the subject matter of any one or more of Examples 11-12 optionally include wherein the instructions further cause the computing device to perform operations that: apply one or more constraints to limit results in the similarity search results, wherein the one or more constraints define requirements for selection of: one or more products of a same product type as the selected product; one or more products of a same product brand as the selected product; one or more products within a predetermined price range above or below the selected product; or one or more products with an in-stock availability.

In Example 14, the subject matter of Example 13 optionally includes wherein the instructions further cause the computing device to perform operations that: evaluate a number of the results in the similarity search, in response to applying the one or more constraints; and relax an application of the one or more constraints to increase the number of the results in the similarity search, in response to the number of the results not satisfying a minimum number of results.

In Example 15, the subject matter of any one or more of Examples 11-14 optionally include wherein the instructions further cause the computing device to perform operations that, before receipt of the request for the similarity search: receive, in the user interface, a search request of the product catalog, the search request including at least one keyword or phrase received in the user interface; generate a product search query to perform the search request, using the at least one AI model; and present, in the user interface, a plurality of product search results in response to the product search query; wherein the plurality of product search results includes the selected product, and wherein the request for the similarity search is performed with a user selection received in the plurality of product search results.

In Example 16, the subject matter of Example 15 optionally includes wherein the at least one AI model generates the attributes to perform the similarity search based on additional information including (i) the at least one keyword or phrase associated with the search request, (ii) a search intent associated with the search request, and (iii) user activity associated with the search request.

In Example 17, the subject matter of any one or more of Examples 11-16 optionally include wherein to present the similarity search results in the user interface includes to: present, in a product listing page, a listing of the one or more products identified as similar to the selected product; and present, in a top section of the product listing page, an identification of the selected product as an anchor product.

In Example 18, the subject matter of any one or more of Examples 11-17 optionally include wherein the at least one AI model includes a generative large language model, and wherein the at least one AI model evaluates attributes associated with the selected product to determine a search intent, and generate at least one keyword or phrase used for identifying the similarity search results based on the determined search intent.

In Example 19, the subject matter of any one or more of Examples 11-18 optionally include wherein the at least one AI model includes a predictive model, and wherein the predictive model generates or refines the search query to perform the similarity search based on dynamic context information associated with: profile information associated with a user; interactions observed in the user interface; or search intent associated with an earlier search performed in the user interface.

In Example 20, the subject matter of any one or more of Examples 11-19 optionally include wherein the instructions further cause the computing device to perform operations that, after presenting the similarity search results in the user interface: present one or more search refinement options applicable to the similarity search results; receive a selection of the one or more search refinement options; generate narrowed search results based on applying the selected refinement options to the similarity search results; and output the narrowed search results to be presented in the user interface.

Example 21 is a non-transitory computer-readable storage medium, the computer-readable storage medium comprising instructions that, when executed by processor circuitry and memory of a computing device, causes the computing device to perform the operations of any of Examples 1 to 20.

Example 22 is a computing device comprising a hardware processor and a memory, the memory storing instructions, which when executed by the hardware processor, cause the computing device to perform the operations of any of Examples 1 to 20.

Example 23 is a computing system comprising means to perform the operations of any of Examples 1 to 20.

Example 24 is an apparatus comprising means to implement any of Examples 1 to 20.

Example 25 is a system to implement any of Examples 1 to 20.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A method for performing a similarity search assisted by a generative artificial intelligence (AI) model, the method comprising operations executed using at least one processor of a computing device, and the operations comprising:

receiving a request for a similarity search, wherein the request for the similarity search is provided in response to a user interaction received in a user interface, and wherein the request for the similarity search includes a product identifier of a selected product already displayed in the user interface;

generating a search query to perform the similarity search, using at least one AI model, wherein the at least one AI model generates the search query based on multiple attributes associated with the selected product, wherein the multiple attributes are identified by the at least one AI model with operations including:

providing the product identifier as input to a first application programming interface (API);

invoking the at least one AI model via the first API, to analyze product data associated with the product identifier and generate multiple attributes of the selected product; and receiving a generated search query, via the first APL produced from the multiple attributes:

performing the similarity search with the generated search query on a product catalog, without a user provided command to invoke the generated search query with operations including;

providing the generated search query as input to a second API;

invoking the second API to automatically perform searches on the product catalog using the generated search query; and receiving similarity search results, via the second API based on use of the generated search query;

sorting the similarity search results in response to performing the similarity search on the product catalog; and presenting the similarity search results in the user interface, wherein the similarity search results include one or more products identified as similar to the selected product.

2. The method of claim 1, wherein the user interaction is a request from a user for a new search to present new products more like the selected product, wherein the product identifier is a stock keeping unit (SKU) number, and wherein the user interaction is received with a button or link presented in the user interface to initiate the similarity search based on the selected product.

3. The method of claim 1, the operations further comprising:

applying one or more constraints to limit results in the similarity search results, wherein the one or more constraints define requirements for selection of:

one or more products of a same product type as the selected product;

one or more products of a same product brand as the selected product;

one or more products within a predetermined price range above or below the selected product; or one or more products with an in-stock availability.

4. The method of claim 3, the operations further comprising:

evaluating a number of the results in the similarity search results, in response to applying the one or more constraints; and relaxing an application of the one or more constraints to increase the number of the results in the similarity search, in response to the number of the results not satisfying a minimum number of results.

5. The method of claim 1, the operations further comprising, before receiving the request for the similarity search:

receiving, in the user interface, a search request of the product catalog, the search request including at least one keyword or phrase received in the user interface;

generating a product search query to perform the search request, using the at least one AI model; and presenting, in the user interface, a plurality of product search results in response to the product search query;

wherein the plurality of product search results includes the selected product, and wherein the request for the similarity search is performed with a user selection received in the plurality of product search results.

6. The method of claim 5, wherein the at least one AI model identifies the multiple attributes to perform the similarity search based on additional information including (i) the at least one keyword or phrase associated with the search request, (ii) a search intent associated with the search request, and (iii) user activity associated with the search request.

7. The method of claim 1, wherein presenting the similarity search results in the user interface includes:

presenting, in a product listing page, a listing of the one or more products identified as similar to the selected product; and presenting, in a top section of the product listing page, an identification of the selected product as an anchor product.

8. The method of claim 1, wherein the at least one AI model includes a generative large language model, and wherein the at least one AI model evaluates the multiple attributes associated with the selected product to determine a search intent, and generates at least one keyword or phrase used for identifying the similarity search results based on the determined search intent.

9. The method of claim 1, wherein the at least one AI model includes a predictive model, and wherein the predictive model generates or refines the search query to perform the similarity search based on dynamic context information associated with:

profile information associated with a user;

interactions observed in the user interface; or search intent associated with an earlier search performed in the user interface.

10. The method of claim 1, the operations further comprising, after presenting the similarity search results in the user interface:

presenting one or more search refinement options applicable to the similarity search results;

receiving a selection of the one or more search refinement options;

generating narrowed search results based on applying the selected refinement options to the similarity search results, and outputting the narrowed search results to be presented in the user interface.

11. A non-transitory computer-readable storage medium, the computer-readable storage medium comprising instructions that, when executed by processor circuitry and memory of a computing device, causes the computing device to provide similarity search results via a user interface, with operations that:

receive a request for a similarity search, wherein the request for the similarity search is provided in response to a user interaction received in a user interface, and wherein the request for the similarity search includes a product identifier of a selected product already displayed in the user interface;

generate a search query to perform the similarity search, using at least one AI model, wherein the at least one AI model generates the search query based on multiple attributes associated with the selected product, wherein the multiple attributes are identified by the at least one AI model with operations that:

provide the product identifier as input to a first application programming interface (API);

invoke the at least one AI model via the first API, to analyze product data associated with the product identifier and generate multiple attributes of the selected product; and receive a generated search query, via the first API, produced from the multiple attributes;

perform the similarity search with the generated search query on a product catalog, without a user-provided command to invoke the generated search query, with operations that:

provide the generated search query as input to a second API;

invoke the second API to automatically perform searches on the product catalog using the generated search query; and receive similarity search results, via the second API, based on use of the generated search query;

sort the similarity search results in response to performing the similarity search on the product catalog; and present the similarity search results in the user interface, wherein the similarity search results include one or more products identified as similar to the selected product.

12. The non-transitory computer-readable storage medium of claim 11, wherein the user interaction is a request from a user for a new search to present new products more like the selected product, wherein the product identifier is a stock keeping unit (SKU) number, and wherein the user interaction is received with a button or link presented in the user interface to initiate the similarity search based on the selected product.

13. The non-transitory computer-readable storage medium of claim 11, wherein the instructions further cause the computing device to perform operations that:

apply one or more constraints to limit results in the similarity search results, wherein the one or more constraints define requirements for selection of:

one or more products of a same product type as the selected product;

one or more products of a same product brand as the selected product;

one or more products within a predetermined price range above or below the selected product; or one or more products with an in-stock availability.

14. The non-transitory computer-readable storage medium of claim 13, wherein the instructions further cause the computing device to perform operations that:

evaluate a number of the results in the similarity search results, in response to applying the one or more constraints; and relax an application of the one or more constraints to increase the number of the results in the similarity search, in response to the number of the results not satisfying a minimum number of results.

15. The non-transitory computer-readable storage medium of claim 11, wherein the instructions further cause the computing device to perform operations that, before receipt of the request for the similarity search:

receive, in the user interface, a search request of the product catalog, the search request including at least one keyword or phrase received in the user interface;

generate a product search query to perform the search request, using the at least one AI model; and present, in the user interface, a plurality of product search results in response to the product search query;

wherein the plurality of product search results includes the selected product, and wherein the request for the similarity search is performed with a user selection received in the plurality of product search results.

16. The non-transitory computer-readable storage medium of claim 15, wherein the at least one AI model generates the multiple attributes to perform the similarity search based on additional information including (i) the at least one keyword or phrase associated with the search request, (ii) a search intent associated with the search request, and (iii) user activity associated with the search request.

17. The non-transitory computer-readable storage medium of claim 11, wherein to present the similarity search results in the user interface includes to:

present, in a product listing page, a listing of the one or more products identified as similar to the selected product; and present, in a top section of the product listing page, an identification of the selected product as an anchor product.

18. The non-transitory computer-readable storage medium of claim 11, wherein the at least one AI model includes a generative large language model, and wherein the at least one AI model evaluates the multiple attributes associated with the selected product to determine a search intent, and generates at least one keyword or phrase used for identifying the similarity search results based on the determined search intent.

19. The non-transitory computer-readable storage medium of claim 11, wherein the at least one AI model includes a predictive model, and wherein the predictive model generates or refines the search query to perform the similarity search based on dynamic context information associated with:

profile information associated with a user;

interactions observed in the user interface; or search intent associated with an earlier search performed in the user interface.

20. The non-transitory computer-readable storage medium of claim 11, wherein the instructions further cause the computing device to perform operations that, after presenting the similarity search results in the user interface:

present one or more search refinement options applicable to the similarity search results;

receive a selection of the one or more search refinement options;

generate narrowed search results based on applying the selected refinement options to the similarity search results; and output the narrowed search results to be presented in the user interface.

* * * * *